United States Patent
Hsin

(10) Patent No.: US 7,663,987 B2
(45) Date of Patent: Feb. 16, 2010

(54) METHOD AND SYSTEM FOR CALIBRATING RECORDING TRACK OFFSET OF OPTICAL STORAGE DEVICE

(75) Inventor: Kuo-Ting Hsin, Hsin-Chu Hsien (TW)

(73) Assignee: Mediatek Inc., Hsin-Chu (TW)

( * ) Notice: Subject to any disclaimer, the term of this patent is extended or adjusted under 35 U.S.C. 154(b) by 472 days.

(21) Appl. No.: 11/735,445

(22) Filed: Apr. 14, 2007

(65) Prior Publication Data

US 2008/0253240 A1   Oct. 16, 2008

(51) Int. Cl.
   *G11B 7/00*   (2006.01)
(52) U.S. Cl. ................... 369/44.29; 369/44.35
(58) Field of Classification Search ............. 369/44.29, 369/44.35, 44.28, 44.27
   See application file for complete search history.

(56) References Cited

U.S. PATENT DOCUMENTS

| | | | |
|---|---|---|---|
| 4,786,849 A * | 11/1988 | Tateishi | 318/632 |
| 5,568,461 A * | 10/1996 | Nishiuchi et al. | 369/44.26 |
| 5,731,924 A * | 3/1998 | Yun | 360/77.08 |
| 5,862,112 A | 1/1999 | Nagai et al. | |
| 5,933,410 A | 8/1999 | Nakane et al. | |
| 6,407,968 B1 | 6/2002 | Nakata et al. | |
| 6,434,096 B1 * | 8/2002 | Akagi et al. | 369/44.28 |
| 6,452,879 B1 * | 9/2002 | Tsukahara et al. | 369/44.36 |
| 6,526,006 B1 * | 2/2003 | Yoshimi et al. | 369/44.28 |
| 6,731,573 B2 | 5/2004 | Takeda | |
| 6,839,310 B2 | 1/2005 | Yoshida | |
| 6,975,566 B2 * | 12/2005 | Park | 369/44.28 |
| 2008/0094975 A1 * | 4/2008 | Lee | 369/53.3 |

* cited by examiner

*Primary Examiner*—Thang V Tran
(74) *Attorney, Agent, or Firm*—Winston Hsu

(57) ABSTRACT

A method for calibrating a recording track offset of an optical storage device accessing an optical storage medium of a land and groove recording/reproduction type includes: setting at least one control parameter of a track offset control loop of the optical storage device to drive the track offset control loop to enter an first state; and recording data onto the optical storage medium with the track offset control loop being enabled to derive the latest value of the recording track offset, where the track offset control loop is utilized for controlling the recording track offset. The method further includes setting the control parameter to drive the track offset control loop to enter a second state, where a loop response of the track offset control loop in the first state is different from that in the second state.

16 Claims, 6 Drawing Sheets

METHOD AND SYSTEM FOR CALIBRATING RECORDING TRACK OFFSET OF OPTICAL STORAGE DEVICE

BACKGROUND

The present invention relates to track offset calibration of an optical storage device, and more particularly, to methods and systems for calibrating a recording track offset of an optical storage device accessing an optical storage medium of a land and groove recording/reproduction type.

Regarding a digital versatile disc (DVD) such as a DVD-Recordable (DVD-R) disc, accurately controlling a track offset of an optical head of a DVD drive during recoding data onto the DVD-R disc is not so important to the recording quality thereof since no obvious problem would occur even if the laser light spot emitted from the optical head is not locked at the center of a groove track of the DVD-R disc. However, regarding a DVD-RAM disc, if the laser light spot emitted from the optical head is not locked at the center of a second track of the DVD-RAM disc while the DVD drive is recording data on the second track, data previously written on a first track adjacent to the second track would probably be erased or overwritten, typically causing a large jitter value that represents poor recording quality. In the worst case, at least a portion of the data on the DVD-RAM disc becomes unreadable.

For example, the second track is a groove track 21G centered at line (b) as shown in FIG. 1. If the laser light spot 24 scans along line (a) while the DVD drive is recording data on the groove track 21G, the data previously written on the first track, which is the land track 21L adjacent to the groove track 21G in this situation, would be damaged. If the laser light spot 24 scans along line (c) while the DVD drive is recording data on the groove track 21G, the data previously written on the first track, which is the land track 22L adjacent to the groove track 21G in this situation, would be damaged.

Sometimes, a typical value of the recording track offset (the track offset in a recording process) would be different from a typical value of the reading track offset (the track offset in a reading process) due to luminosity variations of the laser light spot and unbalance of a so-called PDIC gain. According to the related art, performing online closed loop control would probably be helpful on controlling the recording track offset, where an all sum (AS) signal corresponding to a radio frequency (RF) signal can be utilized for controlling the laser light spot 24 to scan along line (b), as shown in FIG. 2.

During an optimal power calibration (OPC) process that is typically performed before a recording process, if an initial value of the recording track offset (e.g., a zero initial value) is inappropriate, which means the initial value of the recording track offset is far from a real value corresponding to a real radial location of the optical head with respect to a track, an OPC fail would probably occur. Even if no OPC fail occurs, a calibrated value of the recording power of the optical head is usually higher than a typical value of the recording power, which leads to problems such as a decreasing number of overall rewritable times of the DVD-RAM disc, a higher error rate, and a greater jitter value.

Regarding a recording process without performing the OPC process in advance, if an initial value of the recording track offset is unsuitable, first recorded data (e.g. the data previously recorded on the first track mentioned above) will be partially/fully erased or overwritten by later recorded data (e.g. the data recorded on the second track mentioned above). As a result, at least a portion of the first recorded data on the DVD-RAM disc is lost.

SUMMARY

It is an objective of the claimed invention to provide methods and systems for calibrating a recording track offset of an optical storage device accessing an optical storage medium of a land and groove recording/reproduction type.

An exemplary embodiment of a method for calibrating a recording track offset of an optical storage device accessing an optical storage medium of a land and groove recording/reproduction type comprises: setting at least one control parameter of a track offset control loop of the optical storage device to drive the track offset control loop to enter a first state; recording data onto the optical storage medium with the track offset control loop being enabled to derive the latest value of the recording track offset, the track offset control loop being utilized for controlling the recording track offset; and setting the control parameter to drive the track offset control loop to enter a second state, a loop response of the track offset control loop in the first state being different from that in the second state.

An exemplary embodiment of a system for calibrating a recording track offset of an optical storage device accessing an optical storage medium of a land and groove recording/reproduction type comprises: a tracking servo loop for controlling tracking operations of an optical head of the optical storage device; a track offset control loop, coupled to the tracking servo loop, for controlling the recording track offset; and a controller, coupled to the track offset control loop and the tracking servo loop. The controller is capable of setting at least one control parameter of the track offset control loop to drive the track offset control loop to enter a first state, controlling the optical storage device to record data onto the optical storage medium with the track offset control loop being enabled to derive the latest value of the recording track offset, and setting the control parameter to drive the track offset control loop to enter a second state, where a loop response of the track offset control loop in the first state is different from that in the second state.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 3:
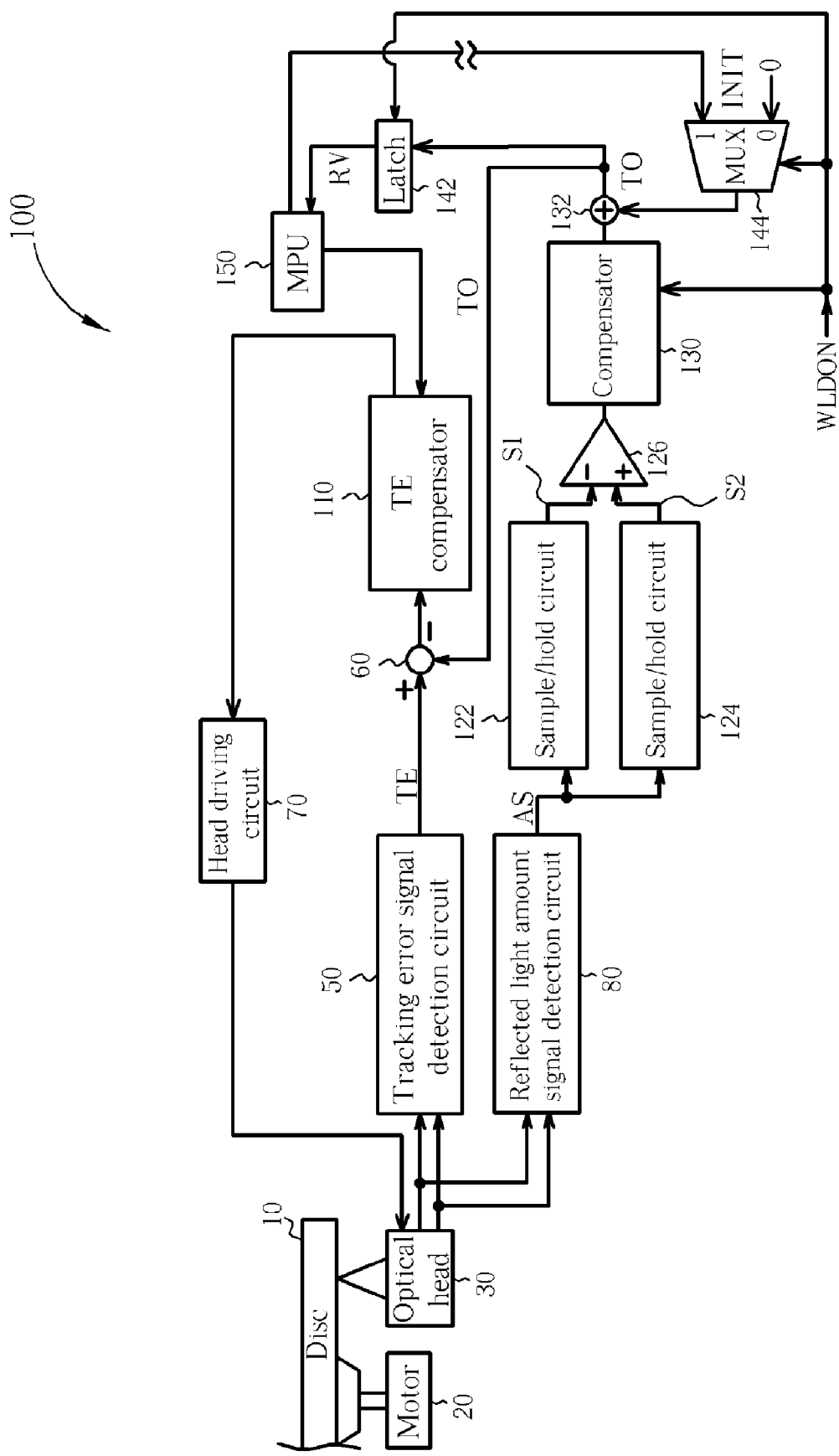
FIG. 3 is a diagram of an optical storage device according to an embodiment of the present invention.

Please refer to FIG. 3. FIG. 3 illustrates an optical storage device 100 such as a digital versatile disc (DVD) drive according to an embodiment of the present invention, where the optical storage device 100 is capable of accessing an optical storage medium 10 of a land and groove recording/reproduction type, for example, an optical disc such as a DVD-RAM. As shown in FIG. 3, a tracking control system of the optical storage device 100 comprises a tracking servo loop comprising a tracking error signal detection circuit 50, a tracking error (TE) compensator 110, and a head driving circuit 70, where the tracking servo loop is utilized for controlling tracking operations of an optical head 30 of the optical storage device 100 along the radial direction with respect to a spindle motor 20 of the optical storage device 100.

The tracking error signal detection circuit 50 is capable of generating a tracking error signal TE according to a reproduced signal comprising at least one of two outputs from the optical head 30. The TE compensator 110 is utilized for performing compensation, in order to control the radial location of the optical head 30 according to the tracking error signal TE by utilizing the head driving circuit 70, where the head driving circuit 70 drives the optical head 30 according to an output of the TE compensator 110.

As shown in FIG. 3, the tracking control system further comprises a track offset control loop comprising a reflected light amount signal detection circuit 80, a sample/hold circuit 122, a sample/hold circuit 124, a differential circuit 126, and a compensator 130, where the track offset control loop mentioned above is typically enabled while the optical storage device 100 is recording data onto the optical storage medium 10.

Figure 1:
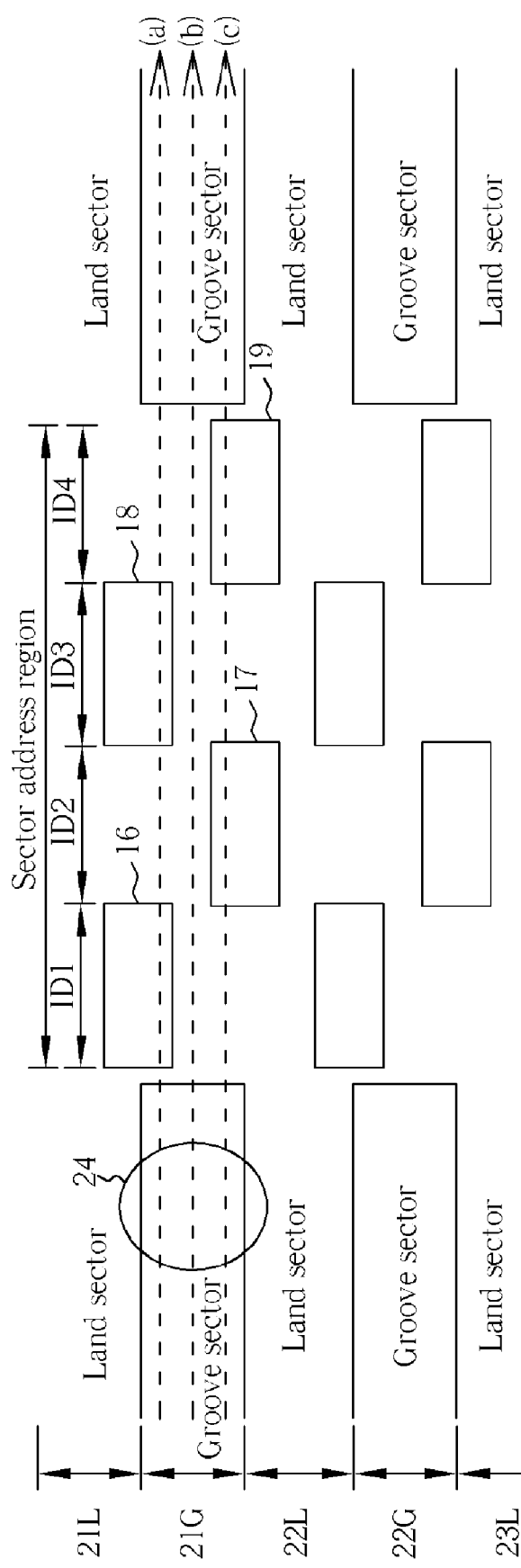
FIG. 1 illustrates groove tracks and land tracks on a DVD-RAM disc according to the related art.
Figure 2:
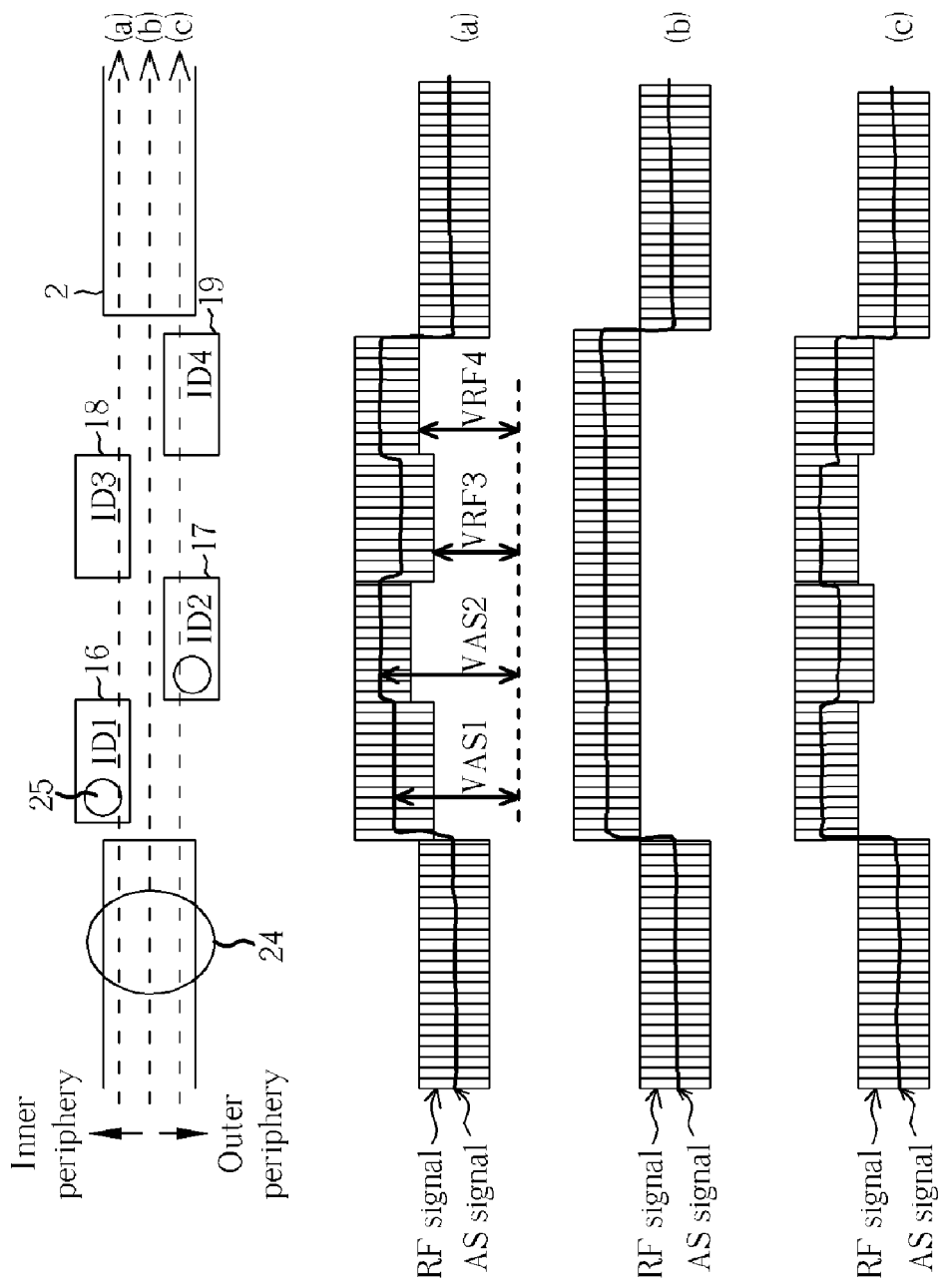
FIG. 2 illustrates an all sum (AS) signal utilized for controlling the recording track offset according to the related art.

The reflected light amount signal detection circuit 80 comprises an addition circuit (not shown) for summing the two outputs from the optical head 30 to generate an added signal, and a low-pass filter (not shown) for filtering the added signal to generate a reflected light amount signal AS, which is also referred to as the all-sum (AS) signal in this embodiment. The sample/hold circuit 122 and the sample/hold circuit 124 sample/hold the reflected light amount signal AS to generate outputs S1 and S2, respectively. In addition, the differential circuit 126 calculates a difference between the outputs S1 and S2. According to a first implementation choice of this embodiment, the outputs S1 and S2 respectively correspond to detection values VAS1 and VAS2 shown in FIG. 2. According to a second implementation choice of this embodiment, the outputs S1 and S2 respectively correspond to detection values VRF3 and VRF4 shown in FIG. 2.

By applying either of the implementation choices mentioned above, the difference outputted from the differential circuit 126 can be utilized as an indication of whether the laser light spot emitted from the optical head 30 is centered at line (b) or whether the laser light spot is shifted toward line (a) or line (c). That is, the difference outputted from the differential circuit 126 can be utilized as an indication of the radial location of the optical head 30. As a result, by utilizing the differential circuit 126 and the compensator 130, the track offset control loop adjusts the tracking error signal TE according to the outputs S1 and S2 respectively from the sample/hold circuit 122 and the sample/hold circuit 124, where an arithmetic unit 132 coupled to the compensator 130 can be utilized for injecting an initial signal into the track offset control loop.

Figure 4:
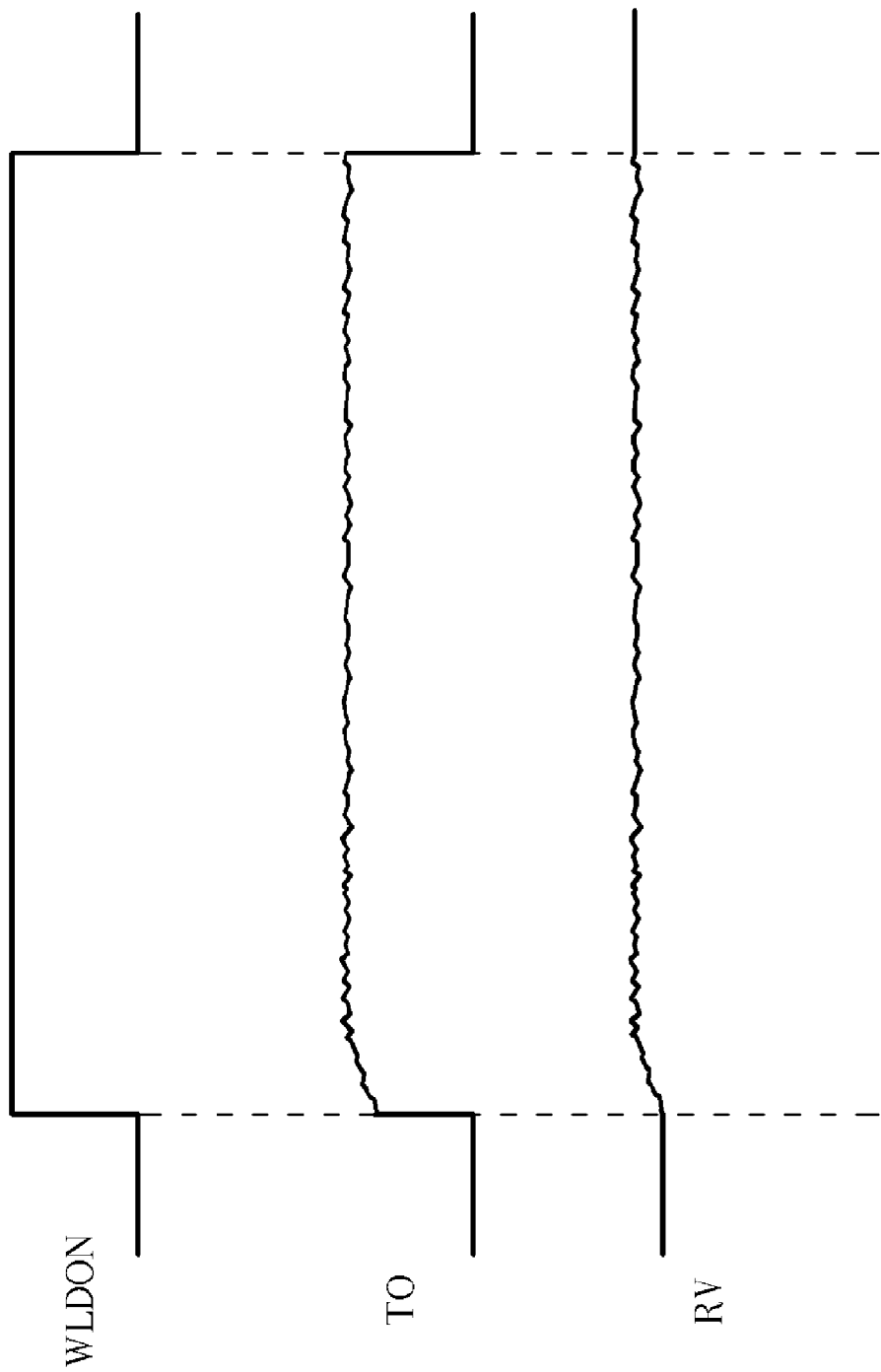
FIG. 4 illustrates waveforms of related signals of the optical storage device according to an embodiment of the present invention.

If a control signal WLDON is corresponding to a logical value "0" representing a reading process, a multiplexer 144 coupled to the arithmetic unit 132 selects a zero input, causing the initial signal injected into the track offset control loop through the arithmetic unit 132 to be substantially zero, where the logical value "0" mentioned above corresponds to a low level in this embodiment, as shown in FIG. 4. Conversely, if the control signal WLDON is corresponding to a logical value "1" representing a recording process, the multiplexer 144 selects an initial value INIT, causing the initial signal injected into the track offset control loop through the arithmetic unit 132 to carry the initial value INIT, where the logical value "1" mentioned above corresponds to a high level in this embodiment, as shown in FIG. 4.

According to this embodiment, in order to perform a recording process, a controller such as a micro-processing unit (MPU) 150 of the optical storage device 100 can be utilized for setting the initial value INIT mentioned above, where the initial value INIT represents an initial track offset. Thus, the track offset control loop may utilize the initial track offset as an initial state (or a beginning point) for performing forward control. As long as the initial value is around a steady state value of the track offset control loop, the recording process can be started from the middle of a track.

It is noted that the initial value INIT can be first derived during a recording track offset calibration process, so the initial value INIT can be utilized for setting the initial state before the recording process or in the beginning of the recording process. As a result, recording user data can be started from the middle of a track.

According to this embodiment, the MPU 150 sets the initial value INIT before the recording process. At the moment when recording is started, the control signal WLDON rises to the high level, and a track offset signal TO outputted from the arithmetic unit 132 is equivalent to the initial signal carrying the initial value INIT. The track offset control loop starts operation with the initial value INIT representing the initial track offset. In order to achieve this, internal state(s) of the compensator 130 and the output thereof are cleared and reset to zero at a time point of a rising edge of the control signal WLDON such as that shown in FIG. 4 since compensators typically have memory effects, which means previous state(s) and output(s) may remain.

As shown in FIG. 3, a latch 142 is utilized for latching the value of the track offset signal TO at a time point of a falling edge of the control signal WLDON such as that shown in FIG. 4. Taking the situation shown in FIG. 4 as an example, when the control signal WLDON falls to the low level, a readout value signal RV outputted from the latch 142 represents a latched value, where the MPU 150 saves the latched value as a readout value for further utilization. For example, in another recording process performed later, the readout value represents the previous control result of the track offset control loop in the previous recording process, and can be utilized as the initial value INIT set by the MPU 150 before the recording process performed later or in the beginning of the recording process performed later. As a result, similar situations may occur as shown in FIG. 4.

In each of these situations such as that shown in FIG. 4, from the time point when the control signal WLDON rises to the high level till the time point when the control signal WLDON falls to the low level, the readout value signal RV has the same waveform as the track offset signal TO, where the track offset signal TO has the same initial value INIT carried by the initial signal at the time point when the control signal WLDON rises to the high level. In addition, at the time point when the control signal WLDON falls to the low level, the latch 142 latches the track offset signal TO and outputs a latched value, so the MPU 150 saves the latched value as a readout value for further utilization. The track offset signal TO is reset to zero at the time point when the control signal WLDON falls to the low level since the multiplexer 144 coupled to the arithmetic unit 132 selects the zero input according to the control signal WLDON.

It is noted that in general, the track offset signal TO injected into the tracking servo loop through the arithmetic unit 60 carries a track offset. According to a variation of this embodiment, a controller such as the MPU 150 mentioned above is capable of deriving the track offset according to a readout value corresponding to the track offset signal TO (e.g. the latched value of the readout value signal RV), and saving (i.e., storing) the track offset represented by the readout value into a storage unit (not shown) such as a register (or memory) within the optical storage device 100. According to this variation, the register (or memory) for saving the track offset is positioned in the MPU 150. In a recording process, the track offset is referred to as a recording track offset, where the compensator 130 mentioned above is capable of controlling the recording track offset according to the difference calculated by the differential circuit 126. As a result, with the above-mentioned operations of the components of the track offset control loop, the track offset control loop can be utilized for controlling the recording track offset. On the other hand, in a reading process, the track offset is referred to as a reading track offset or a reproduction track offset. Within the tracking control system shown in FIG. 3, either the recording track offset or the reading track offset can be set to have an initial value carried by the initial signal injected through the arithmetic unit 132. According to this variation, the initial value INIT carried by the initial signal is set by the MPU 150. In general, a typical value of the recording track offset is not certainly the same as or close to that of the reading track offset. In some occasions, the typical value of the recording track offset is far from that of the reading track offset.

Figure 5:
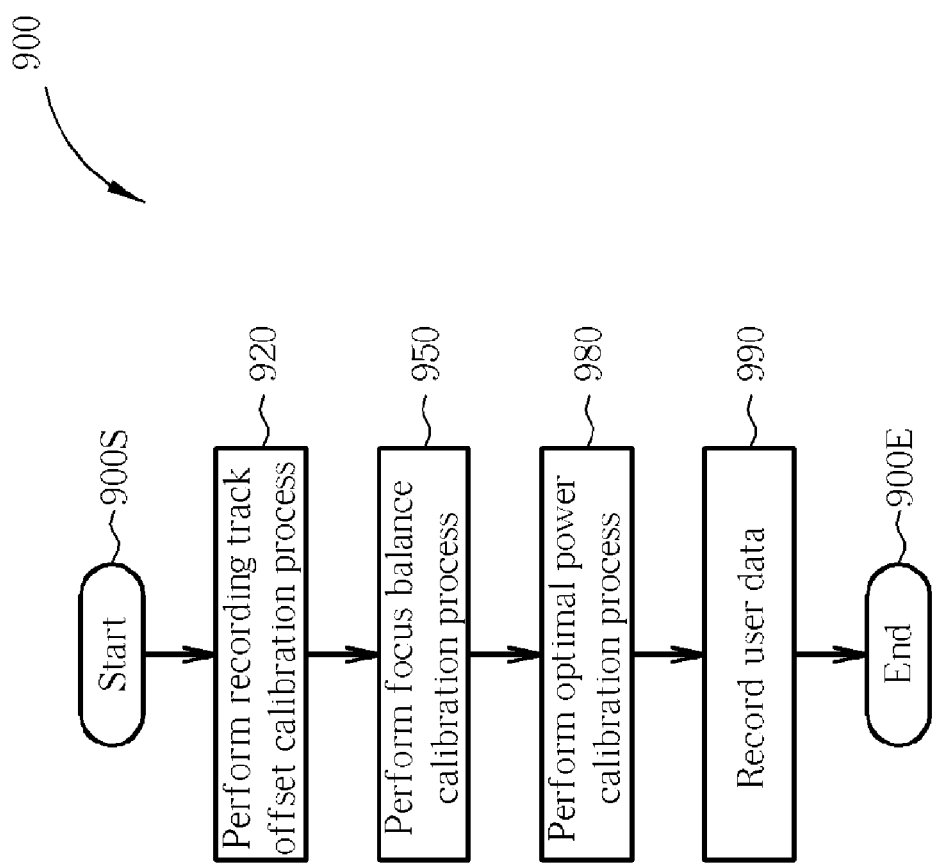
FIG. 5 is a flowchart illustrating calibration steps that an optical storage device performs before recording user data onto an optical storage medium of a land and groove recording/reproduction type according to an embodiment of the present invention.
Figure 6:
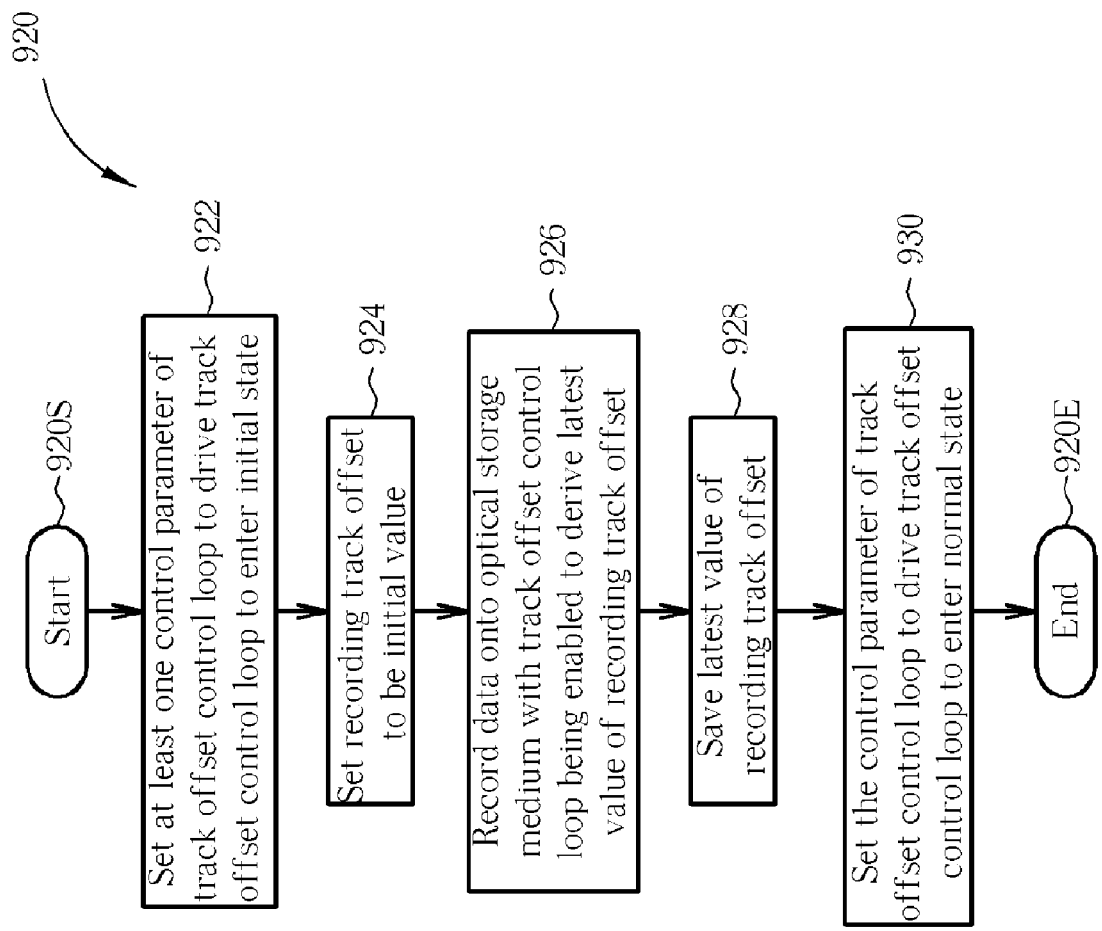
FIG. 6 is a flowchart of a method for calibrating a recording track offset of an optical storage device accessing an optical storage medium of a land and groove recording/reproduction type according to an embodiment of the present invention.

Please refer to FIG. 5 and FIG. 6. FIG. 5 is a flowchart illustrating calibration steps that an optical storage device performs before recording user data onto an optical storage medium of a land and groove recording/reproduction type according to an embodiment of the present invention. FIG. 6 is a flowchart of a method for calibrating a recording track offset of an optical storage device accessing an optical storage medium of a land and groove recording/reproduction type according to an embodiment of the present invention. Both the working flows of the flowcharts shown in FIG. 5 and FIG. 6 can be applied to the optical storage device 100 shown in FIG. 3, where FIG. 6 substantially illustrates detailed steps of Step 920 shown in FIG. 5 according to this embodiment. Additionally, control of steps shown in FIG. 5 and FIG. 6 can be implemented by utilizing a controller such as the MPU 150 executing a firmware code.

According to the flowchart shown in FIG. 5, the optical storage device 100 performs a recording track offset calibration process (Step 920), a focus balance calibration process (Step 950), and a optimal power calibration (OPC) process (Step 980) before recording user data onto the optical storage medium 10 (Step 990), where the OPC process is well known in the art. According to the flowchart shown in FIG. 6, the method can be described as follows:

Step 922: Set at least one control parameter of the compensator 130 of the track offset control loop to drive the track offset control loop to enter a calibration state.

Step 924: Set the recording track offset to be an initial value INIT carried by the initial signal, where the initial value INIT is substantially zero or the typical value of the reading track offset.

Step 926: Record data (e.g., a predetermined test pattern or a portion of the user data) onto the optical storage medium 10 with the track offset control loop being enabled to derive the latest value of the recording track offset. More particularly, in this embodiment, the MPU 150 controls the optical storage device 100 to record data onto a test zone of the optical storage medium 10 with the track offset control loop being enabled to derive the latest value of the recording track offset. According to this embodiment, the MPU 150 derives the latest value of the recording track offset from the readout value corresponding to the track offset signal TO (e.g. the latched value of the readout value signal RV) as mentioned above. In a situation such as that shown in FIG. 4, the latch 142 latches the track offset signal TO and outputs the latched value at the time point when the control signal WLDON falls to the low level in the end of the recording process.

Step 928: Save the latest value of the recording track offset (e.g. the readout value mentioned above) into the storage unit such as the register (or memory) within the optical storage device 100 as mentioned above. The latest value stored in the storage unit can be utilized as a predetermined value to be carried by the initial signal (e.g. the initial value INIT carried by the initial signal) while executing later steps such as Steps 950, 980, or 990. As mentioned above, the MPU 150 may save the latched value as the readout value for further utilization, so once the readout value is stored in the storage unit, it can be considered to be the latest value of the recording track offset for the recording process performed later. Similar descriptions related to further utilization of the calibration result, for example, utilizing the MPU 150 to set the initial value INIT, controlling the control signal WLDON to rise to the high level and controlling the track offset signal TO to be equivalent to the initial signal carrying the initial value INIT at the moment when recording is started, are not repeated in detail here.

Step 930: Set the control parameter of the compensator 130 of the track offset control loop to drive the track offset control loop to enter a normal state, where a loop response of the track offset control loop in the calibration state is different from that in the normal state. More specifically, the loop response of the calibration state is faster than that of the normal state according to this embodiment.

The compensator 130 of this embodiment is implemented by utilizing a filter having a plurality of control parameters, where a loop bandwidth of the track offset control loop can be controlled by properly setting the control parameters. In addition, a loop gain of the track offset control loop can be adjusted by changing the control parameters. As a result, the compensator 130 performs compensation according to the control parameters.

According to this embodiment, the MPU 150 sets the control parameters to drive the track offset control loop to enter the calibration state in Step 922, and sets the control parameters to drive the track offset control loop to enter the normal state, so that the loop bandwidth of the calibration state is higher than that of the normal state. According to a trial experiment with the optical storage device 100 being a DVD drive accessing a DVD-RAM, a typical value of the ratio of the loop bandwidth of the calibration state to the loop bandwidth of the normal state ranges from four to five.

It is noted that the outputs S1 and S2 are indications for determining the recording track offset since the difference between the outputs S1 and S2 represents a radial location shift amount of the optical head 30 with respect to a track. According to this embodiment, if the outputs S1 and S2 are not equal to each other in the calibration state, the recording track offset can be rapidly tuned to the latest value in Step 926, so the radial location of the optical head 30 can be rapidly aligned to the center of the track. In addition, in order to prevent from being prone to errors while performing certain steps that are sensitive to noises (e.g., recording the user data), the slower loop response of the normal state can be utilized after executing Step 930.

According to a variation of this embodiment, the MPU 150 simply sets the control parameters to have different values respectively in Step 922 and 930, so the control parameters set the track offset control loop to have a first loop gain in the calibration state and sets the track offset control loop to have a second loop gain in the normal state, where the first loop gain is greater than the second loop gain. According to a trial experiment with the optical storage device 100 being a DVD drive accessing a DVD-RAM, a typical value of the ratio of the first loop gain to the second loop gain is approximately two.

According to a variation of this embodiment, Step 990 can be executed N times, where Step 990 shown in FIG. 5 can be replaced with Steps 990-0, 990-1, . . . , and 990-(N−1). In addition, Step 920 shown in FIG. 5 can be further executed at least one time between two of Steps 990-0, 990-1, . . . , and 990-(N−1). For example, Step 920 shown in FIG. 5 can be further executed (N−1) times as Steps 920-1, 920-2, . . . , and 920-(N−1) respectively next to Steps 990-0, 990-1, . . . , and 990-(N−2), where the data recorded in Step 926-i corresponding to Step 920-i (i=1, 2, . . . , (N−1)) is not necessary to be recorded onto the test zone mentioned above.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for calibrating a recording track offset of an optical storage device accessing an optical storage medium of a land and groove recording/reproduction type, the method comprising:
    setting at least one control parameter of a track offset control loop of the optical storage device to drive the track offset control loop to enter a first state;
    recording data onto the optical storage medium with the track offset control loop being enabled to derive the latest value of the recording track offset, the track offset control loop being utilized for controlling the recording track offset; and
    setting the control parameter to drive the track offset control loop to enter a second state, a loop response of the track offset control loop in the first state being different from that in the second state.

2. The method of claim 1, further comprising:
    setting the recording track offset to be an initial value before recording data onto the optical storage medium; wherein the initial value is substantially equal to zero or a reading track offset of the optical storage device.

3. The method of claim 1, further comprising:
    saving the latest value as a readout value for further utilization; and
    setting the recording track offset to be an initial value before a recording process performed later or in the beginning of the recording process performed later, wherein the readout value is utilized as the initial value.

4. The method of claim 1, wherein the loop response of the first state is faster than that of the second state.

5. The method of claim 4, wherein the step of setting the control parameter to drive the track offset control loop to enter the first state further comprises setting a plurality of control parameters of the track offset control loop of the optical storage device to drive the track offset control loop to enter the first state, the step of setting the control parameter to drive the track offset control loop to enter the second state further comprises setting the control parameters to drive the track offset control loop to enter the second state, and the control parameters are utilized for controlling a loop bandwidth of the track offset control loop.

6. The method of claim 4, wherein the control parameter sets the track offset control loop to have a first loop gain in the first state and sets the track offset control loop to have a second loop gain in the second state, and the first loop gain is greater than the second loop gain.

7. The method of claim 1, wherein the step of recording data onto the optical storage medium further comprises:
    recording data onto a test zone of the optical storage medium with the track offset control loop being enabled to derive the latest value of the recording track offset.

8. The method of claim 1, wherein in the step of recording data onto the optical storage medium, the data is not recorded onto a test zone of the optical storage medium.

9. A system for calibrating a recording track offset of an optical storage device accessing an optical storage medium of a land and groove recording/reproduction type, the system comprising:
    a tracking servo loop for controlling tracking operations of an optical head of the optical storage device;
    a track offset control loop, coupled to the tracking servo loop, for controlling the recording track offset; and
    a controller, coupled to the track offset control loop and the tracking servo loop, the controller for setting at least one control parameter of the track offset control loop to drive the track offset control loop to enter a first state, controlling the optical storage device to record data onto the optical storage medium with the track offset control loop being enabled to derive the latest value of the recording track offset, and setting the control parameter to drive the track offset control loop to enter a second state, wherein a loop response of the track offset control loop in the first state is different from that in the second state.

10. The system of claim 9, wherein the controller sets the recording track offset to be an initial value before controlling the optical storage device to record data onto the optical storage medium, and the initial value is substantially equal to zero or a reading track offset of the optical storage device.

11. The system of claim 9, wherein the controller saves the latest value as a readout value for further utilization, the track offset control loop sets the recording track offset to be an initial value before a recording process performed later or in the beginning of the recording process performed later, and the readout value is utilized as the initial value.

12. The system of claim 9, wherein the loop response of the first state is faster than that of the second state.

13. The system of claim 12, wherein the controller is capable of setting a plurality of control parameters of the track offset control loop to drive the track offset control loop to enter the first state and setting the control parameters to drive the track offset control loop to enter the second state, and the control parameters are utilized for controlling a loop bandwidth of the track offset control loop.

14. The system of claim 12, wherein the control parameter sets the track offset control loop to have a first loop gain in the first state and sets the track offset control loop to have a second loop gain in the second state, and the first loop gain is greater than the second loop gain.

15. The system of claim 9, wherein the tracking servo loop comprises:
   a tracking error signal detection circuit for generating a tracking error signal according to a reproduced signal from the optical head;
   a tracking error compensator, coupled to the tracking error signal detection circuit and the controller, for performing compensation according to the control parameter, in order to control the radial location of the optical head according to the tracking error signal; and
   a head driving circuit, coupled to the tracking error compensator, for driving the optical head according to an output of the tracking error compensator.

16. The system of claim 9, wherein the track offset control loop comprises:
   a reflected light amount signal detection circuit for generating a reflected light amount signal according to at least one output from the optical head;
   a plurality of sample/hold circuits, coupled to the reflected light amount signal detection circuit, for sampling/holding the reflected light amount signal to generate a plurality of outputs, respectively;
   a differential circuit, coupled to the sample/hold circuits, for calculating a difference between the outputs from the sample/hold circuits; and
   a compensator, coupled to the differential circuit, for controlling the recording track offset according to the difference.

* * * * *